United States Patent
Goetz et al.

(10) Patent No.: US 6,586,530 B1
(45) Date of Patent: Jul. 1, 2003

(54) LOW SURFACE TENSION (METH) ACRYLATE CONTAINING BLOCK COPOLYMER PREPARED BY CONTROLLED RADICAL POLYMERIZATION

(75) Inventors: Jonathan D. Goetz, Sarver, PA (US); Kurt A. Humbert, Pittsburgh, PA (US); Karl F. Schimmel, Verona, PA (US); Karen A. Barkac, Murrysville, PA (US); Simion Coca, Pittsburgh, PA (US); Joanne H. Smith, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/965,546

(22) Filed: Sep. 27, 2001

(Under 37 CFR 1.47)

(51) Int. Cl.[7] .................. C08F 259/00; C08F 230/08; C08F 4/64
(52) U.S. Cl. .............. 525/227; 525/276; 525/199; 525/280; 525/331.2; 525/326.2; 525/254; 525/326.5; 525/294; 525/295; 526/169; 526/170; 526/171; 526/172
(58) Field of Search ................. 525/227, 280, 525/276, 199, 331.2, 326.2, 254, 326.5, 294, 295; 526/169–172

(56) References Cited

U.S. PATENT DOCUMENTS

| | | | |
|---|---|---|---|
| 3,407,247 A | 10/1968 | Reinhardt | 260/881 |
| 4,371,657 A | 2/1983 | Chang | 524/512 |
| 4,396,680 A | 8/1983 | Chang | 428/421 |
| 4,644,043 A | 2/1987 | Ohmori et al. | 526/246 |
| 4,665,144 A | 5/1987 | Ohmori et al. | 526/245 |
| 4,871,820 A | 10/1989 | Ohmori et al. | 426/245 |
| 5,026,621 A | 6/1991 | Tsubunko et al. | 430/109 |
| 5,049,622 A | 9/1991 | Abe | 525/267 |
| 5,283,148 A | 2/1994 | Rao | 430/114 |
| 5,397,669 A | 3/1995 | Rao | 430/108 |
| 5,478,886 A | 12/1995 | Kim | 525/94 |
| 5,597,874 A | 1/1997 | Anton et al. | 525/331.2 |
| 5,629,372 A | 5/1997 | Anton et al. | 524/507 |
| 5,705,276 A | 1/1998 | Anton et al. | 428/421 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,914,384 A | 6/1999 | Anton et al. | 528/83 |
| 5,948,851 A | 9/1999 | Anton et al. | 524/520 |
| 5,986,015 A | 11/1999 | Midha et al. | 525/370 |
| 6,288,173 B1 * | 9/2001 | Schimmel et al. | 525/94 |

FOREIGN PATENT DOCUMENTS

WO   WO 98/40415   9/1998 ............ C08F/4/10

OTHER PUBLICATIONS

U.S. Application 09/965,547, filed Sep. 27, 2001, Claims 1–70.*

* cited by examiner

Primary Examiner—James J. Seidleck
Assistant Examiner—Olga Asinovsky
(74) Attorney, Agent, or Firm—William J. Uhl

(57) ABSTRACT

A block copolymer including a block of residues of a low surface tension (meth)acrylate monomer; a block of residues of a monomer free of hydroxyl group and amine group residues; and, optionally, a third block of residues of a monomer free of hydroxyl groups and amine groups. The first, second and third blocks are made of different residues from each other and the block copolymer has a polydispersity index of less than 2.5. A controlled radical polymerization method is disclosed to make the low surface tension block copolymers. The method includes the steps of sequentially adding a first monomer composition that is free of hydroxyl groups and amine groups and a second monomer composition that includes the low surface tension monomer to a suitable atom transfer radical polymerization initiator and polymerizing the monomer compositions to form a block copolymer.

25 Claims, No Drawings

LOW SURFACE TENSION (METH) ACRYLATE CONTAINING BLOCK COPOLYMER PREPARED BY CONTROLLED RADICAL POLYMERIZATION

FIELD OF THE INVENTION

The present invention relates to novel low surface tension (meth)acrylate containing block (co)polymer compositions prepared by a controlled radical (co)polymerization process, as well as a controlled radical (co)polymerization process to produce the low surface tension (meth)acrylate containing block copolymers.

BACKGROUND OF THE INVENTION

Fluorocarbon containing copolymers have been used as binding agents, wetting agents, surfactants and coating additives in a variety of applications. The fluorocarbon has the potential of providing a surface tension lowering effect. Fluorocarbon containing copolymers made by conventional free radical polymerization methods have inevitable shortcomings as it is difficult to control their molecular weight distribution and composition in order to optimize their desired physical properties. For example, the common problem of poor control of molecular weight distribution can result in a high molecular weight "tail", which can give poor flow properties due to the high viscosity that results. Conversely, poor binding properties can result when too much of a low molecular weight "tail" is present.

U.S. Pat. Nos. 5,397,669 and 5,283,148 disclose an electrostatic liquid toner imaging process that uses a liquid toner comprised of a perfluorinated solvent and a polymer containing highly fluorinated units. The polymer was prepared using traditional free radical polymerization techniques and was characterized as having a polydispersity of 4.

U.S. Pat. No. 3,407,247 discloses fluoro olefin block copolymers prepared by traditional free radical polymerization of a (meth)acrylic monomer to form a prepolymer which is subsequently reacted with a fluoro olefin. While block copolymers were formed to some extent, the resulting block copolymers inherently vary widely in block length and molecular weight leading to a wide compositional variation and distribution as well as a large polydispersity.

U.S. Pat. No. 5,026,621 discloses a toner for electrophotography which includes a block copolymer binder resin comprised of a fluoroalkyl acryl ester block and a fluorine-free vinyl or olefin monomer block. The block copolymers were made using a unique peroxypolyether initiator, which is then used to initiate a first free radical polymerization, forming a peroxypolymer, which initiates a second free radical polymerization. While block copolymers are formed, the resulting block copolymers inherently vary widely in block length and molecular weight, as well as having a wide compositional variation, wide polymer composition distribution and a large polydispersity.

U.S. Pat. No. 5,478,886 discloses alkyl α-fluoroacrylate ester block copolymers prepared by group transfer polymerization techniques. The block copolymers have a polydispersity of less than 2 and do not contain any initiator residue. The disclosure is limited to fluoroacrylate monomers as the fluorocarbon monomer. These types of block copolymers are used, primarily in the electronics industry as photoresists. The block copolymers are particularly subject to photodegradation and provide minimal surface tension lowering properties.

U.S. Pat. Nos. 5,629,372; 5,705,276; and 5,914,384 disclose coating compositions comprising an alkyl (meth)acrylate/fluoroalkyl methacrylate random copolymer and a crosslinking agent. The materials disclosed were suggested for use as clear coating compositions for application over a pigmented base coat. However, minimal surface tension lowering effect is provided because the fluoroalkyl methacrylate is randomly distributed along the polymer.

The use of conventional, i.e., non-living or free-radical (co)polymerization methods to synthesize (co)polymers provides little control over molecular weight, molecular weight distribution and, in particular, (co)polymer chain structure.

U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of polymers having predictable molecular weight and molecular weight distribution. The ATRP process also is described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

A number of initiators and macroinitiator systems are known to support ATRP polymerization. These initiators are described, for example, in U.S. Pat. Nos. 5,807,937 and 5,986,015. U.S. Pat. No. 5,807,937 discloses a number of initiators, including halide groups attached to a primary carbon. Halides attached to primary carbons are known as efficient initiators in ATRP processes. U.S. Pat. No. 5,986,015 discloses polymer macroinitiators prepared from vinyl chloride and another monomer, and their use in preparing graft (co)polymers with low polydispersity.

It also is desirable to have multiple initiation sites on an initiator in order to create unique branched (co)polymer structures, such as star (co)polymers. Such (co)polymers have a variety of practical applications, including use as a resin component of a film-forming coating composition. These unique (co)polymers also will find use in the health care or cosmetics industries for instance, as materials for bioengineering. (Co)polymers of low polydispersity (Mn/Mw) are also desirable not only for their structural regularity and related usefulness in producing defined block and multi-block (co)polymer structures, but for their unique physical characteristics. For instance, a star (co)polymer having low polydispersity is a high molecular weight material having low viscosity in solution.

There remains a need for polymers that have reliable compositions and predictable surface tension lowering effects. Such polymers can overcome the deficiencies of the fluorocarbon copolymers of the prior art.

SUMMARY OF THE INVENTION

In accordance with the present invention, there is provided a block copolymer that includes a first block made up of residues of a first low surface tension (meth)acrylate monomer, a second block containing residues of a second radically polymerizable ethylenically unsaturated monomer that is free of hydroxyl groups and amine groups, and, optionally, a third block containing residues of a third radically polymerizable ethylenically unsaturated monomer that is free of hydroxyl groups and amine groups. The first, second and third blocks are made of different residues from each other. The block copolymer is prepared by controlled radical polymerization and has a has a polydispersity index of less than 2.5.

The present invention is also directed to a method of making a low surface tension (meth)acrylate containing block copolymer using atom transfer radical polymerization (ATRP). The method includes the steps of sequentially adding a first monomer composition, which includes a first radically polymerizable low surface tension (meth)acrylate monomer, and a second monomer composition, which includes one or more radically polymerizable ethylenically unsaturated monomers that are free of hydroxyl groups and amine groups, to a suitable ATRP initiator having at least one radically transferable group to form a living block copolymer; where said first monomer composition and second monomer composition are different from each other. The sequence of addition of the low surface tension (meth)acrylate monomer and the second monomer will vary depending on the exact polymer composition desired.

DETAILED DESCRIPTION OF THE PREFERRED EMBODIMENTS

Other than in the operating examples, or where otherwise indicated, all numbers or expressions referring to quantities of ingredients, reaction conditions, etc, used in the specification and claims are to be understood as modified in all instances by the term "about".

Various numerical ranges are disclosed in this patent application. Because these ranges are continuous, they include every value between the minimum and maximum values. Unless expressly indicated otherwise, the various numerical ranges specified in this application are approximations.

The terms (meth)acrylic and (meth)acrylate are meant to include both acrylic and methacrylic acid derivatives, such as the corresponding alkyl esters often, referred to as acrylates and (meth)acrylates, which the term (meth)acrylate is meant to encompass.

The present invention is directed to a block copolymer that includes a first block made up of residues of a radically polymerizable low surface tension (meth)acrylate monomer, a second block made up of residues of a second radically polymerizable ethylenically unsaturated monomer that is free of hydroxyl groups and amine group residues, and, optionally, a third block made up of residues of a third radically polymerizable ethylenically unsaturated monomer that is free of hydroxyl groups and amine groups. The first, second and third blocks are made of different residues from each other.

Any polymerizable low surface tension (meth)acrylate monomer can be used in the block copolymer of the present invention, preferred low surface tension (meth)acrylate monomers are represented by formulas I and II,

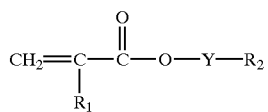
(I)

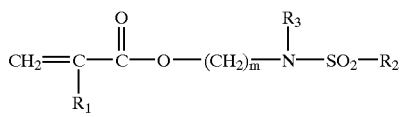
(II)

wherein $R_1$ is selected independently for each general formula from hydrogen, methyl and ethyl, $R_2$ is selected independently for each general formula from a fluorinated hydrocarbon group, a siloxane, a polysiloxane, an alkyl siloxane, an ethoxylated trimethylsilyl siloxane and a propoxylated trimethylsilyl siloxane. $R_2$ may contain from 4–20 carbon atoms, which can be linear, branched, cyclic, aryl or arylalkyl; Y is a divalent linking group containing from 1 to 20 carbon atoms and can be linear, branched, cyclic or aryl; m is an integer from 1 to 4; and $R_3$ is $C_1$–$C_4$ alkyl.

When the group $R_2$ is a fluorinated alkyl group, it can be linear, branched or cyclic. The fluorinated hydrocarbon group $R_2$ can be described by general structure III:

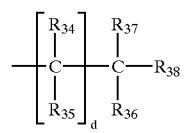
(III)

where $R_{34}$, $R_{35}$, $R_{36}$, $R_{37}$ and $R_{38}$ can each independently be H, F, $C_1$ to $C_6$ alkyl, as long as at least one occurrence of $R_{34}$, $R_{35}$, $R_{36}$, $R_{37}$ or $R_{38}$ is F; and d is an integer from 3 to 19.

When the group $R_2$ is a fluorinated hydrocarbon group, it can be linear, branched, cyclic or aryl. When $R_2$ is a $C_1$–$C_{20}$ linear or branched alkyl group, one or more of the hydrogens are replaced with fluorine atoms. A non-limiting example would be if $R_2$ were a propyl group, in which case it may be 3-fluoropropyl, 3,3-difluoropropyl, 3,3,3-trifluoropropyl, 1,2,3-trifluoropropyl, etc. When $R_2$ is a $C_1$–$C_{20}$ linear or branched cyclic group, one or more of the hydrogens are replaced with fluorine atoms. A non-limiting example would be if $R_2$ were a cyclohexyl group, in which case it may be 3-fluorocyclohexyl, 3,3-difluorocyclohexyl, 1,2,3-trifluorocyclohexyl, 2,3,4,5-tetrafluorocyclohexyl, etc.

When $R_2$ is a $C_1$–$C_{20}$ linear or branched aryl or arylalkyl group, one or more of the hydrogens are replaced with fluorine atoms. Non-limiting examples of fluoroaryl and fuoroarylalkyl groups which can be part of the present block copolymer include those described by general structures IV–VII.

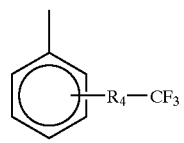
(IV)

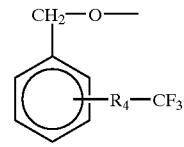
(V)

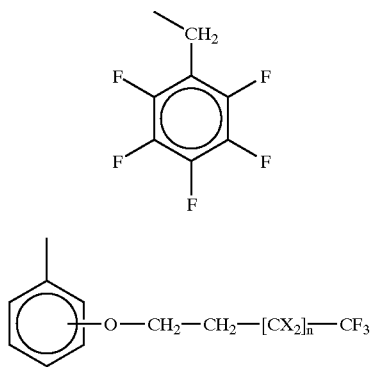

(VI)

(VII)

where $R_4$ is $C_1$–$C_4$ alkyl or alkynol, X is hydrogen or fluorine and n is an integer from 1 to 10.

Typically useful perfluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, trifluoromethyl benzyl acrylate, trifluoromethyl benzyl methacrylate, 1,1,1-trifluoropropyl benzyl acrylate methacrylate, 1,1,1-trifluoropropyl benzyl methacrylate ethyleneglycol perfluorophenyl ether acrylate, ethyleneglycol perfluorophenyl ether methacrylate, 1,1,1,2,2,3,3,4,4,5,5,6,6,7,7,8,8-hexadecafluorodecyl benzyl ether acrylate, 1,1,1,2,2,3,3,4,4,5,5,6,6,7,7,8,8-hexadecafluorodecyl benzyl ether methacrylate, and the like. Preferred are perfluoro alkyl ethyl methacrylates wherein the fluoroalkyl group contains 4–20 carbon atoms and benzyl ether acrylates and methacrylates of Zonyl® FTS fluorotelomer intermediate, Zonyl® FTS is a commercially available $C_9$–$C_{10}$ partially fluorinated alcohol from DuPont.

When $R_2$ includes a siloxane, it may be described by the following general structure VIII:

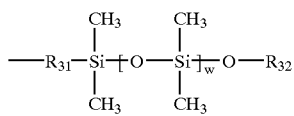

(VIII)

where $R_{31}$ is a linear, branched or cyclic $C_2$–$C_{18}$ alkyl or a polyether as in general formula IX:

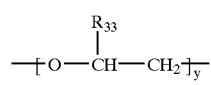

(IX)

where $R_{33}$ is a hydrogen, a halide or methyl and y is from 1 to 100, preferably from 1 to 50 and, more preferably, from 1 to 25 and $R_{32}$ is hydrogen, a linear, branched or cyclic $C_2$–$C_{18}$ alkyl or a trimethylsiloxane as in general structure X:

(X)

$$\begin{array}{c} CH_3 \\ | \\ -Si-CH_3 \\ | \\ CH_3 \end{array}$$

and w is from 0 to 500, preferably from 1 to 100 and, more preferably, from 1 to 50.

Typically useful siloxane containing low surface tension (meth)acrylates include, but are not limited to (meth)acryloxyalkyl terminated polydimethylsiloxanes, such as those available as MCR-M11 and MCR-M17 from Gelest, Inc., Tullytown, Pa. and X-22-174DX and X-22-2426 available as X-22-174DX from Shin-Etsu Chemical Co., Ltd., Tokyo, Japan; (meth)acryloxyalkyl tris(trimethylsiloxy silane), such as that available as X-22-174DX from Shin-Etsu Chemical Co.; and (meth)acryloxyalkyl trimethylsiloxy terminated polyethylene oxide such as that available as SIM0479.0 from Gelest, Inc.

In a preferred embodiment, the Tg value of the second block is at least 20° C., preferably 30° C. greater, than the calculated Tg value of the third block.

In the block copolymer of the present invention, the block copolymer will contain the low surface tension (meth) acrylate monomer in an amount up to 5 wt. %, preferably from 0.01 wt. % to 5 wt. %, more preferably from 0.1 wt. % to 5 wt. % and, most preferably from 1 wt. % to 3 wt. %, based on the total weight of the block copolymer. The ethylenically unsaturated monomers are present in an amount of at least 95 wt. %, preferably from 95 wt. % to 99.99 wt. %, more preferably from 95 wt. % to 99.9 wt. % and, most preferably from 97 wt. % to 99 wt. %, based on the total weight of the block copolymer.

In the block copolymer of the present invention, the first block contains the low surface tension (meth)acrylate monomer and the first block is present in an amount of up to 5 wt. %, preferably from 0.01 to 5 wt. %, more preferably from 0.1 wt. % to 5 wt. % and, most preferably from 1 to 3 wt. %, based on the total weight of the block copolymer. The second block is present in an amount not less than 95 wt. %, preferably from 95 wt. % to 99.99 wt. %, more preferably from 95 wt. % to 99.9 wt. % and, most preferably from 97 wt. % to 99 wt. %, based on the total weight of the block copolymer.

The third block is present in an amount of from 0 wt. % to 75 wt. %, preferably from 20 wt. % to 75 wt. % and, more preferably from 35 wt. % to 65 wt. %, based on the total weight of the block copolymer.

When the third block is present, the block copolymer will include from 0.01 to 5 wt. %, preferably from 0.1 wt. % to 5 wt. % and, more preferably from 1 to 3 wt. % of the first low surface tension (meth)acrylate monomer containing block; from 25 wt. % to 75 wt. %, preferably from 30 wt. % to 70 wt. % and, more preferably from 35 wt. % to 65 wt. % of the second block; and, from 20 wt. % to 74.99 wt. %, preferably from 25 wt. % to 69.9 wt. % and, more preferably from 32 wt. % to 64 wt. % of the third block based on the total weight of the block copolymer.

Optionally, the second ethylenically unsaturated monomer and third ethylenically unsaturated monomer may include a minor amount of a hydroxyl functional monomer. By a minor amount what is meant is that the may be present in at least one of the second and third blocks in an amount of from 0.01 wt. % to 5 wt. %, preferably from 0.05 wt. % to 4 wt. % and, more preferably from 0.1 wt. % to 3 wt. %, based on the total weight of the block; as is the case with the hydroxy functional monomer.

The second radically polymerizable ethylenically unsaturated monomer and third radically polymerizable ethylenically unsaturated monomer can be any radically polymerizable alkylene containing a polar group. The preferred monomers are ethylenically unsaturated monomers and include monomers having general structure XI:

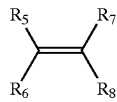
(XI)

where $R_5$, and $R_6$ are independently selected from the group consisting of H, halogen, CN, straight or branched alkyl of 1 to 20 carbon atoms (preferably from 1 to 6 carbon atoms, more preferably from 1 to 4 carbon atoms), aryl, unsaturated straight or branched alkenyl or alkynyl of 2 to 10 carbon atoms (preferably from 2 to 6 carbon atoms, more preferably from 2 to 4 carbon atoms), unsaturated straight or branched alkenyl of 2 to 6 carbon atoms (preferably vinyl) substituted (preferably at the α-position) with a halogen (preferably chlorine), $C_3$–$C_8$ cycloalkyl, heterocyclyl, phenyl which may optionally have from 1 to 5 substituents on the phenyl ring, $C(=Y)R_9$, $C(=Y)NR_{10}R_{11}$, $YCR_{10}R_{11}R_{12}$ and $YC(=Y)R_{12}$, where Y may be $NR_{13}$ or O (preferably O), $R_9$ is alkyl of from 1 to 20 carbon atoms, alkoxy of from 1 to 20 carbon atoms, aryloxy or heterocyclyloxy, $R_{10}$ and $R_{11}$ are independently H or alkyl of from 1 to 20 carbon atoms, or $R_{10}$ and $R_{11}$ may be joined together to form an alkylene group of from 2 to 5 carbon atoms, thus forming a 3- to 6-membered ring, and $R_{12}$ is H, straight or branched $C_1$–$C_{20}$, alkyl and aryl; and $R_7$ is selected from the group consisting of H, halogen (preferably fluorine or chlorine), $C_1$–$C_6$ (preferably $C_1$) alkyl, CN, $COOR_{14}$ (where $R_{14}$ is H, an alkali metal, or a $C_1$–$C_6$ alkyl group) or aryl; or $R_5$ and $R_7$ may be joined to form a group of the formula $(CH_2)_{n'}$ (which may be substituted with from 1 to 2n' halogen atoms or $C_1$–$C_4$ alkyl groups) or $C(=O)$—Y—$C(=O)$, where n' is from 2 to 6 (preferably 3 or 4) and Y is as defined above; and $R_8$ is the same as $R_5$ or $R_6$ or, optionally, $R_8$ is a CN group; at least two of $R_5$, $R_6$, and $R_7$ are H or halogen.

Specific examples of ethylenically unsaturated monomers that may make up a block of the block copolymer of the present invention include ethylenically unsaturated monomers, allylic monomers, olefins (meth)acrylic acid, (meth)acrylates, (meth)acrylamide, N- and N,N-di-substituted (meth)acrylamides, vinyl aromatic monomers, vinyl halides, vinyl esters of carboxylic acids and mixtures thereof. More specific examples of suitable monomers include, without limitation, $C_1$–$C_{20}$ alkyl (meth)acrylates (including linear or branched alkyls and cycloalkyls) which include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isooctane (meth)acrylate; oxirane functional (meth) acrylates which include, but are not limited to, glycidyl (meth)acrylate, 3,4-epoxycyclohexylmethyl(meth)acrylate, and 2-(3,4-epoxycyclohexyl) ethyl(meth)acrylate; hydroxy alkyl (meth)acrylates having from 2 to 4 carbon atoms in the alkyl group which include, but are not limited to, hydroxyethyl (meth)acrylate, hydroxypropyl (meth)acrylate and hydroxybutyl (meth)acrylate. The residues may each independently be residues of monomers having more than one (meth)acryloyl group, such as (meth)acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

In the context of the present application, the terms "alkyl", "alkenyl" and "alkynyl" refer to straight-chain or branched groups. Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and, more preferably, methyl), alkyl of from 1 to 20 carbon atoms (preferably from 1 to 6 carbon atoms and, more preferably, methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$–$C_8$ cycloalkyl, phenyl, halogen, $NH_2$, $C_1$–$C_6$-alkylamino, $C_1$–$C_6$-dialkylamino, and phenyl which may be substituted with from 1 to 5 halogen atoms and/or $C_1$–$C_4$ alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

Specific examples of vinyl aromatic monomers that may be used to prepare the (co)polymer include, but are not limited to, styrene, p-chloromethyl styrene, divinyl benzene, vinyl naphthalene and divinyl naphthalene. Vinyl halides that may be used to prepare the graft copolymer include, but are not limited to, vinyl chloride, p-chloromethylstyrene, vinyl chloroacetate and vinylidene fluoride. Vinyl esters of carboxylic acids that may be used to prepare the (co) polymer include, but are not limited to, vinyl acetate, vinyl butyrate, vinyl 3,4-dimethoxybenzoate and vinyl benzoate.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, with the most preferred heterocyclyl group being pyridyl. Accordingly, suitable vinyl heterocycles to be used as a monomer in the present invention include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocycles mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocycles which, when unsubstituted, contain an N—H group which may be protected at that position with a conventional blocking or protecting group, such as a $C_1$–$C_6$ alkyl group, a tris-$C_1$–$C_6$ alkylsilyl group, an acyl group of the formula $R_{15}CO$ (where $R_{15}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl", also applies to the heterocyclyl groups in "heterocyclyloxyl" and "heterocyclic ring.")

More specifically, preferred monomers include, but are not limited to, styrene, p-chloromethylstyrene, vinyl chloroacetate, acrylate and methacrylate esters of $C_1$–$C_{20}$ alcohols, isobutene, 2-(2-bromopropionoxy) ethyl acrylate, acrylonitrile, and methacrylonitrile.

As used herein and in the claims, by "allylic monomer(s)" is meant monomers containing substituted and/or unsubstituted allylic functionality, i.e., one or more radicals represented by the following general formula XII,

$$H_2C\!=\!C(R_{16})\!—\!CH_2\!— \qquad\qquad (XII)$$

wherein $R_{16}$ is hydrogen, halogen or a $C_1$ to $C_4$ alkyl group. Most commonly, $R_{16}$ is hydrogen or methyl and, consequently, general formula XII represents the unsubstituted (meth)allyl radical. Examples of allylic monomers may each independently be residues of, but are not limited to, (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that may be used to prepare the block copolymer include, but are not limited to: cyclic anhydrides, e.g., maleic anhydride, 1-cyclopentene-1,2-dicarboxylic anhydride and itaconic anhydride; esters of acids that are unsaturated but do not have $\alpha,\beta$-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, the ethylenically unsaturated monomers include a hydrophobic residue of a monomer selected from oxirane functional monomers reacted with a carboxylic acid selected from the group consisting of aromatic carboxylic acids, polycyclic aromatic carboxylic acids, aliphatic carboxylic acids having from 6 to 20 carbon atoms and mixtures thereof: $C_6$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)acrylates, e.g., 2-naphthyl (meth) acrylate; vinyl esters of carboxylic acids, e.g., hexanoic acid vinyl ester and decanoic acid vinyl ester; N,N-di($C_1$–$C_8$ alkyl) (meth)acrylamides; maleimide; N—($C_1$–$C_{20}$ alkyl) maleimides; N—($C_3$–$C_8$ cycloalkyl) maleimides; N-(aryl) maleimides; and mixtures thereof. Examples of N-substituted maleimides include, but are not limited to, N—($C_1$–$C_{20}$ linear or branched alkyl) maleimides, e.g., N-methyl maleimide, N-tertiary-butyl maleimide, N-octyl maleimide and N-icosane maleimide; N—($C_3$–$C_8$ cycloalkyl) maleimides, e.g., N-cyclohexyl maleimide; and N-(aryl) maleimides, e.g., N-phenyl maleimide, N—($C_1$–$C_9$ linear or branched alkyl substituted phenyl) maleimide, N-benzyl maleimide and N—($C_1$–$C_9$ linear or branched alkyl substituted benzyl) maleimide.

The oxirane functional monomer or its residue that is reacted with a carboxylic acid, may be selected from, for example, glycidyl (meth)acrylate, 3,4-epoxycyclohexylmethyl(meth)acrylate, 2-(3,4-epoxycyclohexyl) ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

The monomer containing at least one polar group may be present in an amount up to 5 wt % by weight based on the total amount of monomers. A preferred amount of the monomer containing at least one polar group is 0.01 to 5 wt %; the most preferred amount is 0.1 to 3 wt % based on the total amount of monomers.

In an alternative embodiment, the first block, containing residues of the low surface tension (meth)acrylate monomer may also contain the monomers of structure XI, described above. In this situation, the first block will contain from 0.1 to 99 wt. %, preferably from 1 to 90 wt. %, more preferably from 5 to 95 wt. % and, most preferably, from 10 to 90 wt. % of the low surface tension (meth)acrylate monomer and from 1 to 99.9 wt. %, preferably from 10 to 99 wt. %, more preferably from 5 to 95 wt. % and, most preferably, from 10 to 90 wt. % of one or more monomers of structure XI, described above, based on the total weight of the first block.

In this alternate arrangement of the block copolymer of the present invention, a first block contains the low surface tension (meth)acrylate monomer as well as one or more monomers of structure XI and the first block is present in an amount from 25 wt. % to 75 wt. %, preferably from 30 wt. % to 70 wt. %, more preferably from 35 wt. % to 65 wt. % and, most preferably, from 40 wt. % to 60 wt. %, based on the total weight of the block copolymer. The second block is present in an amount from 25 wt. % to 75 wt. %, preferably from 30 wt. % to 70 wt. %, more preferably from 35 wt. % to 65 wt. % and, most preferably, from 40 wt. % to 60 wt. %, based on the total weight of the block copolymer. As will be discussed later, the first block and second block can occur in any order along the polymer backbone.

The block copolymer of the present invention is prepared by controlled radical polymerization. As used herein and in the claims, the term "controlled radical polymerization," and related terms, e.g., "living radical polymerization," refer to those methods of radical polymerization that provide control over the molecular weight, molecular weight distribution, polydispersity and polymer chain architecture. A controlled or living radical polymerization is also described as a chain-growth polymerization that propagates with essentially no chain transfer and essentially no chain termination. The number of living polymer chains formed during a controlled radical polymerization is often nearly equal to the number of initiators present at the beginning of the reaction. Each living polymer chain typically contains a residue of the initiator at what is commonly referred to as its tail, and a residue of the radically transferable group at what is commonly referred to as its head.

In an embodiment of the present invention, the block copolymer is prepared by atom transfer radical polymerization (ATRP). The ATRP process comprises: (co) polymerizing one or more ethylenically unsaturated polymerizable monomers in the presence of a specific initiation system; forming a (co)polymer; and isolating the formed (co)polymer.

In preparing the block copolymer of the present invention by ATRP, the initiator may be selected from linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiator may also be substituted with functional groups such as oxyranyl groups, which include glycidyl groups. Additional useful initiators and the various radically transferable groups that may be associated with them (cyano, cyanato, thiocyanato, and azide groups for example) are described in U.S. Pat. No. 5,807,937 at column 17, line 4 through column 18 line 28.

Polymeric compounds (including oligomeric compounds) having radically transferable groups may be used as ATRP initiators, and are herein referred to as "macroinitiators". Examples of macroinitiators include, but are not limited to polystyrene prepared by cationic polymerization and having a terminal halide (chloride for example), and a polymer of 2-(2-bromopropionoxy) ethyl acrylate and one or more alkyl (meth)acrylates (butyl acrylate for example) prepared by conventional non-living radical polymerization.

Macroinitiators can be used in the ATRP process to prepare graft polymers, such as grafted block copolymers and comb copolymers. A further discussion of macroinitiators is found in U.S. Pat. No. 5,789,487 at column 13, line 27 through column 18, line 58.

Preferably, the ATRP initiator may be selected from halomethane, methylenedihalide, haloform, carbon tetrahalide (carbon tetrachloride for example), 1-halo-2,3-epoxypropane, methanesulfonyl halide, p-toluenesulfonyl halide, methanesulfenyl halide, p-toluensulfenyl halide, 1-phenylethyl halide, $C_1$–$C_6$-alkyl ester of 2-halo-$C_1$–$C_6$-carboxylic acid, p-halomethylstyrene, monohexakis (α-halo-$C_1$–$C_6$-alkyl) benzene, diethyl-2-halo-2-methyl malonate and mixtures thereof. Particularly preferred ATRP initiators are diethyl-2-bromo-2-methyl malonate and p-toluenesufonyl chloride.

Although the prior art teaches the specific use of halogenated hydrocarbons as preferred initiators for ATRP processes, it has been found as part of the present invention that when fluorocarbon ester (meth)acrylates are used, the C—F bond is too strong and the fluorine atoms, although halogens, do not participate as radically transferable groups in the ATRP process. These monomers are further distinguished from other halogenated monomers in their resistance to photodegradation.

Catalysts that may be used in the ATRP preparation of the block copolymer of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following formula (XIII), $$TM^{n+}X_n \qquad \text{(XIII)}$$

where TM is the transition metal, n is the formal charge on the transition metal having a value of from 0 to 7, and X is a counterion or covalently bonded component. Examples of the transition metal include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)Cl$_2$ when Cu(I)Cl is used. Additional catalysts useful in preparing the block copolymer are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the (co)polymer, include, but are not limited to, compounds having one or more nitrogen, oxygen, phosphorus and/or sulfur atoms, which can coordinate to the transition metal catalyst compound, e.g., through sigma and/or pi bonds. Classes of useful ligands include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkyl-bipyridyls. Additional ligands that may be used in preparing the (co)polymer are described in U.S. Pat. No. 5,807,937 at column 18, line 57 through column 21, line 43.

The initiator includes one or more halide-containing initiation sites that are primarily connected by aliphatic carbons. The connecting aliphatic carbons may include aromatic residues. However, to avoid susceptibility to UV degradation, aromatic moieties are generally avoided. The avoidance of aromatic moieties also isolates each. Typically, the connecting carbons are aliphatic (free from aromatic moieties). The initiator sites are also preferably "symmetrical". By "symmetrical" it is meant that the $K_i$ (initiation constant) for each initiation site and typically the $K_p$ (propagation constant) is substantially the same. By "isolated" it is meant that the $K_i$ and $K_p$ for each initiation site is not affected substantially by the initiation and propagation of polymerization on a second initiation site on the same initiator.

In preparing the block copolymer by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The block copolymer may be prepared in the absence of solvent, i.e., by means of a bulk polymerization process. Generally, the block copolymer is prepared in the presence of a solvent, typically an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the block copolymer is typically conducted at a reaction temperature within the range of 25° C. to 140° C., preferably from 50° C. to 100° C., and a pressure within the range of 1 to 100 atmospheres, usually at ambient pressure. The atom transfer radical polymerization is typically completed in less than 24 hours, preferably between 1 and 8 hours.

The ATRP transition metal catalyst and its associated ligand are typically separated or removed from the (co) polymer product prior to its use. Removal of the ATRP catalyst may be achieved using known methods, including, for example, adding a catalyst binding agent to a mixture of the block copolymer, solvent and catalyst, followed by filtering. Examples of suitable catalyst binding agents include, for example, alumina, silica, clay or a combination thereof. A mixture of the block copolymer, solvent and ATRP catalyst may be passed through a bed of catalyst binding agent. Alternatively, the ATRP catalyst may be oxidized in situ, the oxidized residue of the catalyst being retained in the block copolymer.

The block copolymers of the present invention include a variety of structures, depending upon the structure of the initiator, the monomers used in propagating the copolymer, the reaction conditions and the method of termination of the polymerization process. The block copolymers of the present invention may have star-like structures when the block copolymers are produced by propagating a polymer chain on the above-described poly-functional initiator (three or more initiation sites). Linear block copolymers can be prepared through the use of mono- or di-functional initiators.

The initiators may include active hydrogen-containing groups to permit crosslinking of the initiator by known crosslinking methods. The initiator may include other functionality, such as an ionic group or a group that can be converted into an ionic group, such as a quaternary amine group or a sulfonium group. An ionic group-containing block copolymer prepared in such a manner can be useful as a component of an electrodepositable film-forming composition for use in preparing a coating layer on an electroconductive substrate. The initiator may further contain an active group that permits grafting of other groups to the block copolymer, such as polymer chains that cannot be prepared by a controlled radical polymerization process. An example of such a chain is a polyoxyalkylene chain, which may be useful in solubilizing the block copolymer, depending upon the intended use for the block copolymer.

The choice of monomers used in preparing the block copolymer also is an important factor in determining the structure of the block copolymer. Block polymers can be produced by chain propagation with a sequence of different monomers. The use of hydrophilic monomers (i.e., a poly (alkylene glycol) (meth)acrylate or hydrophobic monomers, i.e. an alkyl (meth)acrylate, will dictate the hydrophobicity and hydrophilicity of defined portions of the block copolymer structure. The use of active hydrogen-containing monomers, i.e., a hydroxyalkyl (meth)acrylate or a (meth) acrylamide, will dictate the reactivity of portions of the (co)polymer to crosslinkers and/or other co-reactive group-containing materials.

As described above, the block copolymer may have nonionic moieties, ionic moieties and combinations thereof.

In an embodiment of the present invention, the ethylenically unsaturated monomers can be selected from, for example, poly(alkylene glycol) (meth)acrylates; $C_1$–$C_4$ alkoxy poly (alkylene glycol) (meth)acrylates; hydroxyalkyl (meth) acrylates having from 2 to 4 carbon atoms in the alkyl group; N-(hydroxy $C_1$–$C_4$ alkyl) (meth)acrylamides, e.g., N-hydroxymethyl (meth)acrylamide and N-(2-hydroxyethyl) (meth)acrylamide; N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates are prepared by known methods. For example, (meth)acrylic acid or hydroxyalkyl (meth)acrylate, e.g., 2-hydroxyethyl (meth) acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of poly(alkylene glycol) (meth)acrylates and $C_1$–$C_4$ alkoxy poly(alkylene glycol) (meth)acrylates include, poly(ethylene glycol) (meth) acrylate and methoxy poly(ethylene glycol) (meth)acrylate, the poly(ethylene glycol) moiety of each having a molecular weight of from 100 to 800. An example of a commercially available $C_1$–$C_4$ alkoxy poly(alkylene glycol) (meth) acrylate is methoxy poly(ethylene glycol) 550 methacrylate monomer from Sartomer Company, Inc. Preferred hydroxy functional monomers are hydroxyalkyl (meth)acrylates having from 2 to 20 carbon atoms in the alkyl group; epoxide functional ethylenically unsaturated radically polymerizable monomers, which are hydrolyzed; hydroxyalkyl (meth) acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms and mixtures thereof. Examples of carboxylic acid functional ethylenically unsaturated monomers include, but are not limited to, (meth) acrylic acid, maleic acid, and fumaric acid. The monomer may be a residue of a precursor of a carboxylic acid functional monomer that is converted to a carboxylic acid residue after completion of the controlled radical (co) polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized methods. Residues of $C_1$–$C_4$ alkyl (meth) acrylates, such as t-butyl methacrylate, can be converted to (meth)acrylic acid residues by art-recognized methods. Salts of carboxylic acid functional monomers include, for example, salts of (meth)acrylic acid and primary, secondary or tertiary amines, such as, butyl amine, dimethyl amine and triethyl amine.

Amine functional monomers include, for example, amino ($C_2$–$C_4$ alkyl) (meth)acrylates, e.g., 2-aminoethyl (meth) acrylate, 3-aminopropyl (meth)acrylate and 4-aminobutyl (meth)acrylate; N—($C_1$–$C_4$ alkyl) amino($C_2$–$C_4$ alkyl) (meth)acrylates, e.g., N-methyl-2-aminoethyl (meth) acrylate; N,N-di($C_1$–$C_4$ alkyl)amino($C_2$–$C_4$ alkyl) (meth) acrylates, e.g., N,N-dimethyl-2-aminoethyl (meth)acrylate; and N,N-di($C_1$–$C_4$ alkyl)aminoethyl (meth)acrylates. The monomer may also comprise residues of salts of amine functional monomers, e.g., salts of those amine functional monomers as recited previously herein. Salts of the amine functional monomer residues may be formed by mixing a carboxylic acid, e.g., lactic acid, with the (co)polymer after completion of controlled radical (co)polymerization.

In an embodiment of the present invention, the block copolymer can contain a segment that includes carboxylic acid functional monomers selected from (meth)acrylic acid, maleic anhydride, maleic acid, di($C_1$–$C_4$ alkyl) maleates, and mixtures thereof. In a still further embodiment of the present invention, the (co)polymer segment is a residue of amine functional monomers selected from amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

The block copolymer also may contain a segment that contains cationic moieties selected from ammonium, sulphonium and phosphonium. Ammonium, sulphonium and phosphonium moieties may be introduced into the block copolymer by means known to the skilled artisan. For example, when the block copolymer contains a residue of N,N-dimethyl-2-aminoethyl (meth)acrylate, the N,N-dimethylamino moieties may be converted to ammonium moieties by mixing an acid, e.g., lactic acid, with the polymer.

When the segment of the block copolymer contains residues of oxirane functional monomers, such as glycidyl (meth)acrylate, the oxirane groups may be used to introduce sulphonium or phosphonium moieties into the polymer. Sulphonium moieties may be introduced into the polymer by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the graft (co)polymer.

In the present invention, the method of making the low surface tension (meth)acrylate containing block copolymer using ATRP generally includes the steps of sequentially adding a first monomer composition that includes the first radically polymerizable low surface tension (meth)acrylate monomer and a second monomer composition that includes one or more radically polymerizable ethylenically unsaturated monomers that are free of hydroxyl groups and amine groups, to a suitable ATRP initiator having at least one radically transferable group to form a living block copolymer. The first monomer composition and second monomer composition are different from each other.

By sequentially adding what is meant is that one monomer composition is added to the ATRP initiator and is substantially polymerized to a living ATRP polymer. The second monomer composition is then added to the living ATRP polymer and is substantially polymerized to form a block copolymer. By the use of the term sequentially, no order of addition of the monomer compositions is implied. The first monomer composition can be added, followed by the second monomer composition; or the second monomer composition may be added first followed by the first monomer composition.

The present method may further include the step of sequentially adding a third monomer composition comprising radically polymerizable ethylenically unsaturated monomers that are free of hydroxyl groups and amine groups to the living ATRP block copolymer. The third monomer composition is generally different than the first monomer composition and the second monomer composition. When three monomer compositions are used to make the present block copolymer, they may be added in any order.

The block copolymer can have two or more segments. In a two-segment block copolymer, the copolymer may have the general formula XIV:

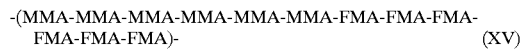  (XIV)

where each of A and B in general formula XIV may represent one or more types of monomer residues, while p and s represent the average total number of A and B residues occurring per block or segment of A residues (A-block or A-segment) and B residues (B-block or B-segment), respectively, t is an integer and refers to the number of initiator sites present on the initiator, φ is the residue from the initiator and T is a radically transferable group, typically a halide. When containing more than one type or species of monomer residue, the A- and B-blocks may each have at least one of block, e.g., di-block and tri-block and alternating. For purposes of illustration, an A-block containing 6 residues of methyl methacrylate (MMA) and 6 residues of fluoromethyl methacrylate (FMA), for which p is 12, may have di-block, tetra-block, alternating and gradient architectures as represented in general formulas XV to XVIII.

Di-Block Architecture

-(MMA-MMA-MMA-MMA-MMA-MMA-FMA-FMA-FMA-FMA-FMA-FMA)-  (XV)

Tetra-Block Architecture

-(MMA-MMA-MMA-FMA-FMA-FMA-MMA-MMA-MMA-FMA-FMA-FMA)-  XVI

Alternating Architecture

-(MMA-FMA-MMA-FMA-MMA-FMA-MMA-FMA-MMA-FMA-MMA-FMA)-  XVII

Gradient Architecture

-(MMA-MMA-MMA-2EHM-MMA-MMA-2EHM-2EHM-MMA-2EHM-2EHM-2EHM)-  (XVIII)

The B-block may be described in a manner similar to that of the A-block.

The order in which monomer residues occur along the backbone of the block copolymer typically is determined by the order in which the corresponding monomers are fed into the vessel in which the controlled radical polymerization is conducted. For example, the monomers that are incorporated as residues in the A-block of the block copolymer are generally fed into the reaction vessel prior to those monomers that are incorporated as residues in the B-block.

During formation of the A- and B-blocks, if more than one monomer is fed into the reaction vessel at a time, the relative reactivities of the monomers typically determine the order in which they are incorporated into the living polymer chain.

Subscripts p and s in general formula XIV represent average numbers of residues occurring in the respective A- and B-blocks. Typically, subscript s has a value of at least 1, and preferably at least 5 for general formula XIV. Also, subscript s has a value of typically less than 300, preferably less than 100, more preferably less than 50 and, most preferably 20 or less, for general formula XIV. Further, s may be a number from 1 to 50. In addition to the ranges described above, s can range from 1 to 20, preferably from 1 to 15, more preferably from 1 to 10 and most preferably from 2 to 8. The value of subscript s may range between any combination of these values, inclusive of the recited values.

Subscript p may have a value of at least 1, and preferably at least 5. Subscript p also typically has a value of less than 300, preferably less than 100, more preferably less than 50 and, most preferably 20 or less. Further, p may be a number from 1 to 50. In addition to the ranges described above, p can range from 1 to 20, preferably from 1 to 15, more preferably from 1 to 10 and most preferably from 2 to 8. The value of subscript p may range between any combination of these values, inclusive of the recited values.

The block copolymer typically has a number average molecular weight (Mn) of from 500 to 100,000, preferably from 1,000 to 50,000 and most preferably from 1,000 to 20,000, as determined by gel permeation chromatography using polystyrene standards. The polydispersity index, i.e., weight average molecular weight (Mw) divided by the number average molecular weight (Mn) of the block copolymer typically is less than 2.5, preferably less than 2.0, more preferably less than 1.8 and, most preferably less than 1.5.

Symbol φ of general formula XIV is or is derived from the residue of the initiator used in the preparation of the block copolymer by controlled radical polymerization, and is free of the radically transferable group of the initiator. In the process of the present invention, the radically transferable group is typically a halide group, preferably a bromide group. The halide residue may be (a) left on the block copolymer, (b) removed or (c) chemically converted to another moiety. The radically transferable group may be removed by substitution with a nucleophilic compound, e.g., an alkali metal alkoxylate. Graft-group-terminal halogens can be removed from the block copolymer by means of a mild dehalogenation reaction. The reaction is typically performed as a post-reaction after the graft (co)polymer has been formed, and in the presence of at least an ATRP catalyst. Preferably, the dehalogenation post-reaction is performed in the presence of both an ATRP catalyst and its associated ligand.

The block copolymers of the present invention can be used as, without limitation, film-forming compositions, rheology modifiers, pigment or ink dispersants, gel matrices and molding resins. The fields of use of the block copolymers are varied and include, without limitation: articles and industrial uses, such as in the automotive industry; medical uses, such as in the production of novel films and matrices for use in bioengineering and tissue engineering; pharmaceutical uses, such as in the production of drug delivery matrices and chemical industry uses, such as in the preparation of gels for product separation and purification; and in chemical and biological research, such as in tailored gel matrices for reagent purification.

The block copolymer of the present invention may be further described as containing at least one of the following representative polymer chain structures XIX and XX:

| | |
|---|---|
| —(M)$_s$—(L)$_p$— | XIX |
| —(L)$_p$—(M)$_s$— | XX | where L is a residue of at least one ethylenically unsaturated low surface tension (meth)acrylate monomer and M is a residue of at least one second radically polymerizable ethylenically unsaturated monomer that is free of hydroxyl or amine groups. The values of s and p are as described above for general formula XIV. In polymer chain structures XIX and XX, residue M may optionally be residues having a minor amount of hydroxyl or amine functional ethylenically unsaturated radically polymerizable monomer as described above.

As stated previously, when the block copolymer of the present invention is made using ATRP, it will contain a residue from the initiator, φ. Depending on the number of radically transferable groups on the initiator, the location of initiator residue φ will vary. When one radically transferable group is present in the initiator, structures XXI and XXII can result. When two radically transferable groups are present in the initiator, structures XXIII and XXIV can result:

| | |
|---|---|
| XXI | φ-(M)$_s$-(L)$_p$-T |
| XXII | φ-(L)$_p$-(M)$_s$-T |
| XXIII | T-(L)$_p$-(M)$_s$-φ-(M)$_s$-(L)$_p$-T |
| XXIV | T-(M)$_s$-(L)$_p$-φ-(L)$_p$-(M)$_s$-T | in which φ is or is derived from the residue of the initiator free of radically transferable groups and T is or is derived from the radically transferable group of the initiator.

The block copolymer of the present invention may be additionally described as containing at least one of the following representative-polymer chain structures XXV–XXX:

| | |
|---|---|
| —(M)$_s$—(L)$_p$—(E)$_q$— | XXV |
| —(M)$_s$—(E)$_q$—(L)$_p$— | XXVI |
| —(L)$_p$—(M)$_s$—(E)$_q$— | XXVII |
| —(L)$_p$—(E)$_q$—(M)$_s$— | XXVIII |
| —(E)$_q$—(M)$_s$—(L)$_p$— | XXIX |
| —(E)$_q$—(L)$_p$—(M)$_s$— | XXX | in which E is a block of monomers containing at least one third radically polymerizable ethylenically unsaturated monomer that is free of hydroxyl groups and amine groups. The third monomer contained in E is different than the second radically polymerizable ethylenically unsaturated monomer. The integers s and p are as defined above and the integer q represents average numbers of residues occurring in a block of residues; and q is independently 0, 1 or an integer greater than 1 and are each independently greater than 1 and can be from 1 to 100, preferably from 1 to 60, and more preferably from 1 to 30, for each structure. In addition to the ranges described above, q can range from 0 to 20, preferably from 1 to 15, more preferably from 1 to 10 and, most preferably, from 2 to 8. The value of subscript q may range between any combination of these values, inclusive of the recited values.

Preferably, the calculated Tg of residue M is 20° C., more preferably 30° C. greater than the calculated Tg of monomer residue E.

When the block copolymer of the present invention is prepared by ATRP in the presence of an initiator having a radically transferable group, the block copolymer may be further described as having at least one of the following structures XXXI–XXXVI:

| | |
|---|---|
| φ-[—(M)$_s$—(F)$_p$—(E)$_q$—T]$_z$ | XXXI |
| φ-[—(M)$_s$—(E)$_q$—(F)$_p$—T]$_z$ | XXXII |
| φ-[—(F)$_p$—(M)$_s$—(E)$_q$—T]$_z$ | XXXIII |
| φ-[—(F)$_p$—(E)$_q$—(M)$_s$—T]$_z$ | XXXIV |
| φ-[—(E)$_q$—(M)$_s$—(F)$_p$—T]$_z$ | XXXV |
| φ-[—(E)$_q$—(F)$_p$—(M)$_s$—T]$_z$ | XXXVI | in which φ is or is derived from the residue of the initiator free of radically transferable groups; T is or is derived from the radically transferable group of the initiator; z is at least equal to the number of radically transferable groups of the initiator and is independently, for each structure at least 1, for example from 1 to 100, preferably from 1 to 50, more preferably from 1 to 10 and, most preferably, from 1 to 5. When the present block copolymer has a star, core-arm or comb type architecture, z is 2 or more and may be from 2 to 10 and in some cases will be from 3 to 8. The value of subscript z may range between any combination of these values, inclusive of the recited values.

With reference to polymer chain structures XXXI–XXXVI, each of M and E are optionally and independently also residues having a minor amount of at least one hydroxy functional ethylenically unsaturated radically polymerizable monomer, such as hydroxypropyl (meth) acrylate. The hydroxy functional ethylenically unsaturated radically polymerizable monomer is as described previously herein.

Symbol T of general formulas XXVIII–XXXIII is or is derived from the radically transferable group of the initiator. For example, when the block copolymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, such as an alkali metal alkoxylate. However, in the present invention, it is desirable that the method by which the radically transferable group is either removed or chemically converted also be relatively mild.

In an embodiment of the present invention, when the radically transferable group is a halogen, the halogen can be removed by means of a mild dehalogenation reaction. The reaction is typically performed as a post-reaction after the polymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated block copolymer of the present invention with one or more ethylenically unsaturated compounds, which are not readily radically polymerizable under at least a portion of the spectrum of conditions under which ATRP polymerizations are performed, hereinafter referred to as "limited radically polymerizable ethylenically unsaturated monomers" (LRPEU compound). As used herein, by "halogen terminated" and similar terms is meant to be inclusive also of pendant halogens, such as those that would be present in branched, comb and star polymers.

Not intending to be bound by any theory, it is believed, based on the evidence at hand, that the reaction between the halogen terminated block copolymer and one or more LRPEU compounds results in (1) removal of the terminal halogen group, and (2) the addition of at least one carbon-carbon double bond where the terminal carbon-halogen bond is broken.

The dehalogenation reaction is typically conducted at a temperature of from 0° C. to 200° C., preferably from 0° C. to 160° C., at a pressure in the range of 0.1 to 100 atmospheres, preferably from 0.1 to 50 atmospheres. The reaction is also typically performed in less than 24 hours, preferably between 1 and 8 hours. While the LRPEU compound may be added in less than a stoichiometric amount, it is preferably added in at least a stoichiometric amount relative to the number of moles of terminal halogen present in the block polymer. When added in excess of a stoichiometric amount, the LRPEU compound is typically present in an amount of no greater than 5 mole percent, preferably 1 to 3 mole percent in excess of the total moles of terminal halogen.

Limited radically polymerizable ethylenically unsaturated compounds useful for dehalogenating the block copolymer of the composition of the present invention under mild conditions include those represented by the general formula XXXVII:

In general formula XXXVII, $R_{17}$ and $R_{18}$ can be the same or different organic groups such as alkyl groups having from 1 to 4 carbon atoms; aryl groups; alkoxy groups; ester groups; alkyl sulfur groups; acyloxy groups; and nitrogen-containing alkyl groups where at least one of the $R_{17}$ and $R_{18}$ groups is an organo group, while the other can be an organo group or hydrogen. For instance, when one of $R_{17}$ and $R_{18}$ is an alkyl group, the other can be an alkyl, aryl, acyloxy, alkoxy, arenes, sulfur-containing alkyl group, or nitrogen-containing alkyl and/or nitrogen-containing aryl groups. The $R_{19}$ groups can be the same or different groups selected from hydrogen or lower alkyl selected such that the reaction between the terminal halogen or the block copolymer and the LRPEU compound is not prevented. Also an $R_{19}$ group can be joined to the $R_{17}$ and/or the $R_{18}$ groups to form a cyclic compound.

It is preferred that the LPREU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4, 4-trimethyl-1-pentene).

For purposes of illustration, the reaction between halogen terminated block copolymer and LRPEU compound, such as alpha-methyl styrene, is summarized in the following general scheme 1.

General Scheme 1

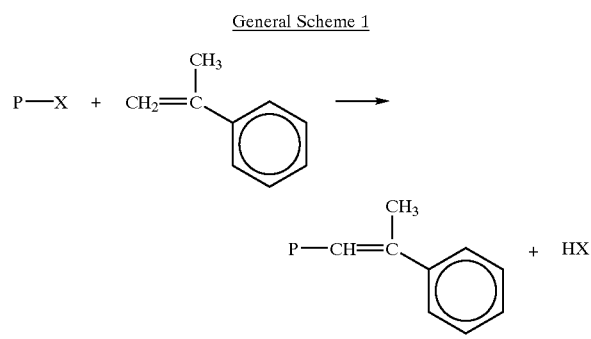

In general scheme 1, P—X represents the halogen terminated block copolymer.

The block copolymers of the present invention are unique in that they contain low surface tension (meth)acrylate blocks. This property can be very useful, for example, when the present block copolymers are used in coating applications. Not wishing to be bound to a single theory, it is believed that the surface tension reducing effect of the low surface tension (meth)acrylate blocks of the block copolymer of the present invention provide superior flow control properties and coating physical properties to all types of coating compositions. It is believed that the low surface tension (meth)acrylate blocks orient at the coating/air interface, effectively reducing the surface tension of the coating, thus minimizing surface defects such as waviness and cratering. The non-surface tension lowering (meth)acrylate blocks extend into the coating adding strength to the coating and improving adhesion to the coated substrate. The orientation of the low surface tension (meth)acrylate blocks as described above is not possible with random copolymers. In a random copolymer, if the low surface tension (meth)acrylate monomer is present at high enough concentration, the entire polymer will orient at the coating/air interface. At lower low surface tension (meth)acrylate monomer concentration, the random copolymer will simply remain in the coating. Therefore, the dual properties of coating property improvement and improved adhesion to the substrate cannot be realized with a random copolymer containing low surface tension (meth)acrylate monomer.

The present invention is more particularly described in the following examples, which are intended to be illustrative only, since numerous modifications and variations therein will be apparent to those skilled in the art. Unless otherwise specified, all parts and percentages are by weight.

sion of greater than 95% was observed, the monomer mix for the second block, consisting of 287.5 grams of 2-ethylhexyl methacrylate and 10.5 grams of 2-hydroxy ethyl methacrylate was added over 30 minutes followed by a 5.0 gram toluene rinse. Conversion was followed, as explained above, until greater than 95% conversion was attained. The monomer for a third block, 2-(perfluoroalkyl) ethyl methacrylate (obtained from DuPont as Zonyl® ™), was mixed with 30 grams of toluene and was added to the flask over a 15-minute period followed by a 5.0 gram toluene rinse. Conversion was followed as outlined above. After the target conversion was achieved, the mass was cooled to ambient temperature and 62.5 grams of magnesium silicate was added along with 500 grams of toluene. The material was stirred and heated to 90° C. and held at that temperature for 1 hour. The material was then cooled to ambient temperature and filtered through a premade filter cake in a filter press (25.0 grams magnesium silicate and 350 grams of toluene) in which the magnesium silicate in the press had been allowed to settle. The filtered material was vacuum stripped and the temperature was taken to 158° C. at a maximum vacuum of 720 mm of mercury. Table 1 details the amount of each monomer used in each example as well as the molecular weight data for each polymer, determined by gel permeation chromatography using polystyrene standards.

TABLE 1

| Ex. No. | Block 1 | | | Block 2 | | Block 3 | Molecular Wt. Data | | |
|---|---|---|---|---|---|---|---|---|---|
| | EBIB (g) | IBMA (g) | HPMA (g) | EHMA (g) | HEMA (g) | PFEM (g) | Peak MW | Mn | PDI |
| 1 | 17.0 | 287.5 | 14.5 | 287.5 | 10.5 | 3.88 | 16,119 | 8,123 | 1.8 |
| 2 | 17.0 | 287.5 | 14.5 | 287.5 | 10.5 | 7.7 | 15,734 | 7,927 | 1.7 |
| 3 | 17.0 | 287.5 | 14.5 | 287.5 | 10.5 | 11.6 | 15,763 | 5,903 | 1.5 |
| 4 | 17.0 | 287.5 | 14.5 | 287.5 | 10.5 | 15.5 | 16,713 | 8,485 | 1.7 |
| 5 | 18.2 | 287.5 | 14.5 | 287.5 | 10.5 | 17.9 | 17,003 | 9,212 | 1.7 |

EBIB—ethyl-2-bromoisobutyrate
IBMA—isobutyl methacrylate
HPMA—2-hydroxypropyl methacrylate
EHMA—2-ethylhexyl methacrylate
HEMA—2-hydroxyethyl methacrylate (Zonyl ™ from Dupont)
EPOSAEM—2-(N-ethylperfluorooctanesulfonamido) ethyl methacrylate (Fluorad FX-14 from 3M)
PDI = Mw/Mn

EXAMPLES 1–5

A 2 liter 4 neck round bottom flask was equipped with a stirrer, temperature probe, addition funnels and a nitrogen source. To the flask, 300.0 grams of toluene, 5.5 grams of copper powder, 13.6 grams of dipyridyl and ethyl-2-bromoisobutyrate (amount in table 1) were added. A light nitrogen sparge was introduced and the material was heated to 50° C. at which time the sparge was removed and a nitrogen blanket was maintained for the duration of the process. The contents of the flask were heated to 90° C. over 30 minutes.

The monomers for block 1 were fed as a mixture of 287.5 grams of isobutyl methacrylate and 14.5 grams 2-hydroxypropyl methacrylate to the flask over 30-minutes from an addition funnel with the temperature being maintained at 90±2° C. Following the addition, 5.0 grams of toluene were used to rinse and clean the addition funnel and was added to the flask directly. The conversion of the polymerization was followed by total solids determination (30 minutes @ 120° F.) every 30 minutes. When a conver-

EXAMPLE 6

Comparative example made using conventional free radical polymerization techniques. To a 2 liter four neck round bottom flask equipped as outlined above, 236.9 of xylene was added. The xylene was lightly sparged with nitrogen and heated to 80° C. at which point the sparge was removed and a nitrogen blanket was initiated and used throughout the entire polymerization. The charge was then heated to 140° C.+/−2° C. during the polymerization. An initiator charge comprised of 60.0 grams of di-t-amyl peroxide in 80.0 grams of xylene was started and added over a 2-hour period. Ten minutes after the initiator charge was started, a monomer charge comprised of 586.0 grams of 2-ethylhexyl acrylate, 168.0 grams of ethyl acrylate and 64.0 grams of 2-(N-ethylperfluorooctane sulfonamido) ethyl methacrylate obtained from 3M as Fluorad FX-14 was started and added over 90 minutes. After both charges were added the reaction was held for 2 hours at temperature. A post-reaction initiator charge comprised of 4.0 grams of t-butylperacetate (Lupersol 75M) was added over 15 minutes and the reaction was held for 2 hours. The flask was then heated to 155° C. and distillate was removed. When no more distillate was obtained, a vacuum strip was performed to remove the last vestiges of solvent and unrecalled monomers. The peak MW was 8357 the number average was 4432 and the polydispersity was 2.7, as determined by gel permeation chromatography using polystyrene standards.

EXAMPLES 7–12

Epoxy-acid powder clear coat compositions, Examples 7–12, were processed as follows: The components were blended in a Henschel Blender for 60 to 90 seconds. The mixtures were then extruded through a Werner & Pfleider, co-rotating twin-screw extruder at a 450 RPM screw speed and an extrudate temperature of 100° C. to 125° C. The extruded material was then ground to a particle size of 17 to 27 microns using an ACM Grinder (Air Classifying Mill from Micron Powder Systems, Summit, N.J.). The finished powders were electrostatically sprayed onto test panels and evaluated for coatings properties.

Flow Additive Resin Example #6 is a comparative example, which was made by a conventional free radical acrylic polymerization, not an ATRP controlled polymerization. In Table 2, all amounts shown are parts by weight.

TABLE 2

| Ingredient | Ex. 7 | Ex. 8 | Ex. 9 | Ex. 10 | Ex. 11 | Example 12 Comparative |
|---|---|---|---|---|---|---|
| Resin[1] | 1037.0 | 1037.0 | 1037.0 | 1037.0 | 829.6 | 829.6 |
| DDDA[2] | 340.5 | 340.5 | 340.5 | 340.5 | 272.4 | 272.4 |
| Ex. 1* | 15.0 | | | | | |
| Ex. 2* | | 15.0 | | | | |
| Ex. 3* | | | 15.0 | | | |
| Ex. 4* | | | | 15.0 | | |
| Ex. 5* | | | | | 12.0 | |
| Ex. 6* | | | | | | 12.0 |
| Benzoin | 3.0 | 3.0 | 3.0 | 3.0 | 2.4 | 2.4 |
| Wax C Micropowder[3] | 9.0 | 9.0 | 9.0 | 9.0 | 7.2 | 7.2 |
| TINUVIN 144[4] | 30.0 | 30.0 | 30.0 | 30.0 | 24.0 | 24.0 |
| CGL-1545[5] | 30.0 | 30.0 | 30.0 | 30.0 | 24.0 | 24.0 |
| GCA-1[6] | 30.0 | 30.0 | 30.0 | 30.0 | 24.0 | 24.0 |
| ARMEEN M2C[7] | 5.6 | 5.6 | 5.6 | 5.6 | 4.4 | 4.4 |

[1]GMA Functional Acrylic Resin
[2]Dodecanedioic Acid.
[3]Wax C Micro Powder, a fatty acid amide (ethylene bis-stearoylamide), commercially available from Hoechst-Celanese.
[4]TINUVIN 144 (2-tert-butyl-2-(4-hydroxy-3,5-di-tert-butylbenzyl) [bis(methyl-2,2,6,6,-tetramethyl-4-piperidinyl)]dipropionate), an ultraviolet light stabilizer available from Ciba-Geigy Corp.
[5]CGL-1545 (2-[4((2-Hydroxy-3-(2-ethylhexyloxy) propyl]-oxy]-2-hydroxyphenyl) -4,6-bis (2,4-dimethylphenyl)-1,3,5-triazine), an ultraviolet light stabilizer available from Ciba-Geigy Corp.
[6]GCA-1, an anti-yellowing agent commercially available from Sanko Chemical Corp.
[7]Methyl dicocoamine available from Akzo-Nobel Corp.
*Resin from the specified example The powder coating compositions of Examples 7 to 12 were prepared for testing in the following manners. Test panels, coated with a black electrocoat primer commercially available from PPG Industries, Inc. as ED-5051, were coated with each of the powder clearcoats by electrostatic spray. The coated test panels were then cured for 30 minutes at 293° F. (145° C.) . The dry film thickness (DFT) of the powder clear coat was 61–69 microns. Examples 7–11 all resulted in test panels that exhibited glossy clear films with good appearance. The crater robustness of the test panel for Example 7 was acceptable, while Examples 8–11 all had good crater robustness on the test panels that were sprayed.

The test panel, for example 12, had poor appearance and its crater robustness was also poor.

The data demonstrate the ability of the block copolymer of the present invention to effectively perform as a flow control agent in powder coatings.

The present invention has been described with reference to specific details of particular embodiments thereof. It is not intended that such details be regarded as limitations upon the scope of the invention except insofar as and to the extent that they are included in the accompanying claims.

We claim:

1. A method of making a low surface tension (meth) acrylate containing block copolymer using atom transfer radical polymerization (ATRP) comprising the steps of sequentially adding a first monomer composition comprising a first radically polymerizable low surface tension (meth)acrylate monomer represented by the general formula:

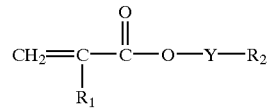

wherein $R_1$ is selected from hydrogen, methyl and ethyl, $R_2$ is selected from the group consisting of linear, branched, cyclic, aryl and arylalkyl fluorinated hydrocarbon groups containing from 4–20 carbon atoms; Y is a divalent linking group containing from 1 to 20 carbon atoms; and a second monomer composition comprising one or more radically polymerizable ethylenically unsaturated monomers that are free of hydroxyl groups and amine groups, to a suitable ATRP initiator having at least one radically transferable group to form a living block copolymer, wherein said first monomer composition and second monomer composition are different from each other.

2. The method of claim 1 further comprising the step of sequentially adding a third monomer composition comprising radically polymerizable ethylenically unsaturated monomers that are free of hydroxyl groups and amine groups to said living block copolymer, wherein said third monomer composition is different than said first monomer composition and said second monomer composition.

3. The method of claim 1 wherein the structure of group $R_2$ is selected from the group consisting of:

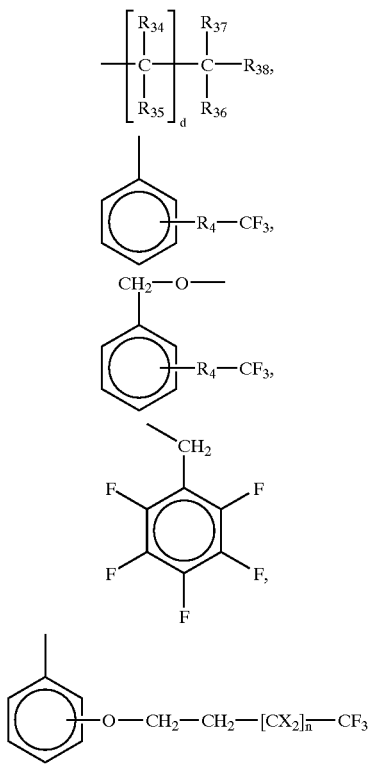

wherein $R_{34}$, $R_{35}$, $R_{36}$, $R_{37}$ and $R_{38}$ are independently selected from the group consisting of H, F and $C_1$–$C_6$ alkyl; such that at least one occurrence of $R_{34}$, $R_{35}$, $R_{36}$, $R_{37}$ or $R_{38}$ is F; d is an integer from 3 to 19; $R_4$ is selected from the group consisting of $C_1$–$C_4$ alkyl and $C_1$–$C_4$ alkynol; X is selected from the group consisting of H and F; n is an integer from 1 to 10.

4. The method of claim 2 wherein the calculated Tg value of said third monomer composition is at least 20° C. less than the calculated Tg value of said second monomer composition.

5. The method of claim 2 wherein at least one of said second monomer composition and said third monomer composition comprises a minor amount of at least one radically polymerizable ethylenically unsaturated monomer selected from the group of a residue of an hydroxy functional radically polymerizable ethylenically unsaturated monomer and a residue of an amine functional radically polymerizable ethylenically unsaturated monomer.

6. The method of claim 1 wherein said suitable ATRP initiator is selected from the group consisting of linear or branched aliphatic compounds, cycloaliphatic compounds, aromatic compounds, polycyclic aromatic compounds,. heterocyclic compounds, sulfonyl compounds, sulfenyl compounds, esters of carboxylic acids, polymeric compounds and mixtures thereof, each having at least one radically transferable halide.

7. The method of claim 6 wherein said suitable ATRP initiator is selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluensulfenyl halide, 1-phenylethyl halide, C1–C6-alkyl ester of 2-halo-$C_1$–$C_6$-carboxylic acid, p-halomethylstyrene, mono-hexakis(α-halo-$C_1$–$C_6$-alkyl)benzene, diethyl-2-halo-2-methyl malonate, and mixtures thereof.

8. The method of claim 1 wherein said low surface tension containing block copolymer is selected from the group consisting of linear copolymers, branched copolymers, hyperbranched copolymers, star copolymers, graft copolymers and mixtures thereof.

9. The method of claim 1 wherein said radically polymerizable low surface tension (meth)acrylate monomer is present in an amount of from 0.01 percent by weight to 5 percent by weight, based on the total weight of said low surface tension containing block copolymer; and said radically polymerizable ethylenically unsaturated monomers are present in an amount of from 95 percent by weight to 99.99 percent by weight, based on the total weight of said low surface tension containing block copolymer.

10. The method of claim 2 wherein said first monomer composition is present in an amount of from 0.01 percent by weight to 5 percent by weight, based on the total weight of said low surface tension containing block copolymer; said second monomer composition is present in an amount of from 25 percent by weight to 75 percent by weight, based on the total weight of said low surface tension containing block copolymer; and said third monomer composition is present in an amount of from 20 percent by weight to 24.99 percent by weight, based on the total weight of said low surface tension containing block copolymer.

11. The method of claim 5 wherein said hydroxy functional monomer is present in at least one of said second monomer composition and said third monomer composition in an amount of from 0.01 percent by weight to 3 percent by weight, based on the total weight of said block.

12. The method of claim 1 wherein each of said second monomer composition and said third monomer composition are comprised of monomers independently selected from vinyl monomers, allylic monomers, olefins, and mixtures thereof.

13. The method of claim 1 wherein said radically polymerizable ethylenically unsaturated monomers are selected from isobornyl (meth)acrylate, n-butyl methacrylate, iso-butyl methacrylate, ethyl methacrylate, iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate and mixtures thereof.

14. The method of claim 1 wherein said radically polymerizable ethylenically unsaturated monomers are selected from the group consisting of isobornyl (meth)acrylate, n-butyl methacrylate, iso-butyl methacrylate and ethyl methacrylate.

15. The method of claim 5 wherein said hydroxy functional monomer is selected from the group consisting of: hydroxyalkyl (meth)acrylates having from 2 to 20 carbon atoms in the alkyl group; epoxide functional ethylenically unsaturated radically polymerizable monomers, which are hydrolyzed; hydroxyalkyl (meth)acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof.

16. The method of claim 15 wherein said hydroxyalkyl (meth)acrylate is selected from hydroxyethyl (meth)acrylate, hydroxypropyl (meth)acrylate, hydroxybutyl (meth)acrylate, and mixtures thereof; said epoxide functional monomer is selected from the group consisting of glycidyl (meth)acrylate, 3,4-epoxycyclohexylmethyl (meth)acrylate, 2-(3,4-epoxycyclohexyl)ethyl (meth)acrylate, allyl glycidyl ether, and combinations thereof; said lactone is selected from the group consisting of β-propiolactone, β-butyrolactone, γ-butyrolactone, α-methyl-γ-butyrolactone, β-valerolactone, γ-lactone, γ-caprolactone, ε-caprolactone, and mixtures thereof; and said beta-hydroxy ester functional (meth)acrylate is the reaction product of glycidyl (meth)acrylate and isostearic acid.

17. The method of claim 1 wherein $R_1$ is hydrogen or methyl, Y is $-(CH_2)_n-$, n being an integer from 1 to 11.

18. A low surface tension containing block copolymer prepared according to the method of claim 1.

19. The low surface tension containing block copolymer as claimed in claim 18, wherein said low surface tension containing block copolymer has at least one of the following representative polymer chain structures:

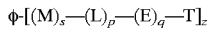

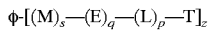

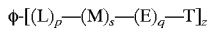

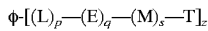

and

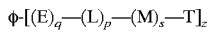

wherein L is a residue of at least one first radically polymerizable low surface tension (meth)acrylate monomer, M is a residue of at least one second ethylenically unsaturated radically polymerizable monomer that is free of hydroxyl groups and amine groups; E is a residue of at least one third radically polymerizable ethylenically unsaturated monomer that is free of hydroxyl groups and amine groups, said third monomer being different than said first monomer and said second monomer; φ is or is derived from the residue of said initiator free of said radically transferable group; T is or is derived from said radically transferable group of said initiator; z is independently for each structure at least 1, s, p and q represent average numbers of residues occurring in a block of residues; s and p are each independently from 1 to 100 for each structure; q is independently 0 to 100 for each structure, and said low surface tension containing block copolymer has a polydispersity index of less than 2.5.

20. The low surface tension containing block copolymer of claim 19 wherein T is halide.

21. The low surface tension containing block copolymer of claim 19 wherein T is derived from a dehalogenation post-reaction.

22. The low surface tension containing block copolymer of claim 21 wherein said dehalogenation post-reaction comprises contacting said block copolymer with a limited radically polymerizable ethylenically unsaturated compound.

23. The low surface tension containing block copolymer of claim 22 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin, and combinations thereof.

24. The low surface tension containing block copolymer of claim 19 wherein said block copolymer has the following representative polymer chain structure:

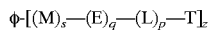

in which the low surface tension (meth)acrylate monomer (L) is a residue selected from the group consisting of perfluoroalkyl ethyl (meth)acrylates wherein the perfluoroalkyl group contains 4–20 carbon atoms; benzyl ether (meth)acrylates of a $C_9-C_{10}$ partially fluorinated alcohol; (meth)acrylate esters of a $C_9-C_{10}$ partially fluorinated alcohol; the second monomer (M) is a residue selected from the group consisting of isobornyl (meth)acrylate, n-butyl methacrylate, iso-butyl methacrylate, ethyl methacrylate and mixtures thereof; the third monomer (E) is a residue selected from the group consisting of iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate, and mixtures thereof; and z is 1.

25. The low surface tension containing block copolymer of claim 19 wherein said block copolymer has a number average molecular weight of from 500 to 100,000.

* * * * *

UNITED STATES PATENT AND TRADEMARK OFFICE
CERTIFICATE OF CORRECTION

PATENT NO. : 6,586,530 B1
DATED : July 1, 2003
INVENTOR(S) : Jonathan D. Goetz et al.

It is certified that error appears in the above-identified patent and that said Letters Patent is hereby corrected as shown below:

Column 27,
Line 30, the following polymer chain structure should be inserted before the word "and": -- $\phi$ ---[(E)q-(M)s-(L)p-T]z --.

Signed and Sealed this

Twenty-first Day of June, 2005

JON W. DUDAS
*Director of the United States Patent and Trademark Office*